US007072868B2

(12) United States Patent
Baxter et al.

(10) Patent No.: US 7,072,868 B2
(45) Date of Patent: Jul. 4, 2006

(54) METHODS AND SYSTEMS FOR NEGOTIABLE-INSTRUMENT FRAUD PREVENTION

(75) Inventors: Craig A. Baxter, Castle Rock, CO (US); John Charles Ciaccia, Parker, CO (US); Rodney J. Esch, Littleton, CO (US)

(73) Assignee: First Data Corporation, Englewood, CO (US)

( * ) Notice: Subject to any disclaimer, the term of this patent is extended or adjusted under 35 U.S.C. 154(b) by 504 days.

(21) Appl. No.: 10/371,984

(22) Filed: Feb. 20, 2003

(65) Prior Publication Data

US 2004/0167860 A1 Aug. 26, 2004

(51) Int. Cl.
*G06Q 99/00* (2006.01)

(52) U.S. Cl. ............... 705/64; 705/65; 705/67; 705/75; 705/78; 713/150; 713/155; 713/156; 713/157

(58) Field of Classification Search ............ 705/64–79, 705/50, 35–45; 713/150, 155–157
See application file for complete search history.

(56) References Cited

U.S. PATENT DOCUMENTS

| | | | |
|---|---|---|---|
| 4,321,672 A * | 3/1982 | Braun et al. .............. | 705/42 |
| 4,864,618 A | 9/1989 | Wright et al. | |
| 5,216,229 A | 6/1993 | Copella et al. | |
| 5,371,798 A | 12/1994 | McWhortor | |
| 5,432,506 A | 7/1995 | Chapman | |
| 5,627,909 A | 5/1997 | Blaylock et al. | |
| 5,668,897 A | 9/1997 | Stolfo | |
| 5,673,320 A | 9/1997 | Ray et al. | |
| 5,801,365 A | 9/1998 | Katz | |
| 5,912,974 A | 6/1999 | Holloway et al. | |
| 5,915,024 A | 6/1999 | Kitaori et al. | |
| 5,920,628 A | 7/1999 | Indeck et al. | |
| 5,949,885 A | 9/1999 | Leighton | |
| 5,974,148 A * | 10/1999 | Stambler .................. | 705/75 |
| 6,021,491 A | 2/2000 | Renaud | |
| 6,073,121 A | 6/2000 | Ramzy | |
| 6,111,953 A | 8/2000 | Walker et al. | |
| 6,170,744 B1 | 1/2001 | Lee et al. | |
| 6,181,814 B1 * | 1/2001 | Carney .................... | 382/137 |
| 6,182,219 B1 | 1/2001 | Feldbau et al. | |
| 6,209,095 B1 | 3/2001 | Anderson et al. | |
| 6,212,504 B1 | 4/2001 | Hayosh | |
| 6,233,340 B1 | 5/2001 | Sandru | |
| 6,263,438 B1 | 7/2001 | Walker et al. | |

(Continued)

FOREIGN PATENT DOCUMENTS

WO        WO 94/21066        *    9/1994

OTHER PUBLICATIONS

Marjanovic, "Citigroup Bulks Up Check-Fraud Defense.", American Banker, v165,n121,p. 12 (dialog file 16, accession No. 07517067).*

(Continued)

*Primary Examiner*—James Trammell
*Assistant Examiner*—Jalatee Worjloh
(74) *Attorney, Agent, or Firm*—Townsend and Townsend and Crew LLP (57) ABSTRACT

An authentication value is provided in a magnetic-ink field of a negotiable instrument. The authentication value is derived from application of an encryption algorithm defined by a secure key. The authentication value may be used to authenticate the instrument through reapplication of the encryption algorithm and comparing the result with the authentication value. The instrument is authenticated if there is a match between the two.

28 Claims, 7 Drawing Sheets

U.S. PATENT DOCUMENTS

| | | |
|---|---|---|
| 6,367,013 B1 | 4/2002 | Bisbee et al. |
| 6,505,179 B1 | 1/2003 | Kara |
| 6,792,110 B1 | 9/2004 | Sandru |
| 2001/0037455 A1 | 11/2001 | Lawandy et al. |
| 2002/0067827 A1 | 6/2002 | Kargman |
| 2002/0174334 A1 | 11/2002 | Meadow et al. |
| 2002/0184152 A1 | 12/2002 | Martin |
| 2003/0044043 A1 | 3/2003 | Kaneda |
| 2003/0225708 A1* | 12/2003 | Park et al. ............ 705/69 |

OTHER PUBLICATIONS

Menezes et al., "Handbook of Applied Cryptography", CRC PRess, pp. 20,224 and 363.*

Bruce Schneier, Applied Cryptography, book, 1996, Chapters 12,13,14,18; John Wiley & Sons, Inc., Canada.

* cited by examiner

METHODS AND SYSTEMS FOR NEGOTIABLE-INSTRUMENT FRAUD PREVENTION

BACKGROUND OF THE INVENTION

This application is related to negotiable instruments. More specifically, this application is related to methods and systems for preventing fraudulent use of negotiable instruments.

A significant concern among financial institutions, as well as among businesses and individuals who accept negotiable instruments generally, is the level of fraud that exists in connection with negotiable instruments. This fraud is manifested in the use of checks, certified checks, travelers' checks, and the like. Because of this concern, a variety of techniques have been developed to permit detection of fraudulent instruments and thereby reduce the incidence of fraud. These techniques may generally be grouped according to two classifications. Techniques in the first classification rely on comparing characteristics of negotiable instruments presented for payment with lists of characteristics known to identify valid instruments. For example, a list of valid serial numbers for negotiable instruments issued by a particular financial institution may be maintained so that when an instrument is presented for payment, a comparison may be made between the serial number of the presented instrument and the list of valid serial numbers. If there is no match, the instrument may be declined. The success of these types of techniques is limited by the ease with which counterfeiters may deduce the relatively simple manner in which serial numbers or other characteristics are assigned.

Techniques in the second classification incorporate fraud-prevention devices directly into the negotiable instruments themselves. In some cases, such devices are used in a uniform fashion, such as when they are applied in substantially the same way to all negotiable instruments issued by a particular financial institution. Examples of such devices include watermarks, pantograph patterns, holographs, and the like incorporated directly into the paper of the instrument. Because these devices are not unique to any particular instrument, their value is mainly in acting as a deterrent to fraud by increasing the difficulty of a counterfeiting process. There are, however, a significant number of counterfeiters who possess the capabilities needed to reproduce such features. A different approach that has been proposed is to print a bar code onto each negotiable instrument, with the bar code derived from information included elsewhere on the instrument, such as its serial number, the amount of the instrument, or the date of execution of the instrument. While this approach has some advantages over other approaches, it tends to be unreliable in systems where instruments are truncated or that otherwise use scanning and electronic transmission of images of the instrument. Furthermore, the presence of a bar code on the instrument requires the use of an additional type of reader when processing the instrument.

There is accordingly a general need in the art for improved methods and systems that prevent fraudulent use of negotiable instruments.

BRIEF SUMMARY OF THE INVENTION

Thus, embodiments of the invention provide an authentication value in a magnetic-ink field of the negotiable instrument, where the authentication value is derived from application of a encryption algorithm defined by a secure key. Such a feature may then be used to authenticate the instrument through reapplication of the encryption algorithm and comparing the result with the authentication value. The instrument is authenticated only if there is a match between the two. This feature is manifested in various embodiments.

In a first set of embodiments, a document is provided for conducting a financial transaction. The document comprises information fields for providing written information to qualify the document as a negotiable instrument. It also comprises a magnetic-ink field having characters printed on the document with ink that comprises a magnetic material. The magnetic-ink field includes an authentication value derived through application of an encryption algorithm defined by a secure key to information also printed on the document. In one such embodiment, the encryption algorithm may be one of a plurality of possible encryption algorithms, each of which is defined by a secure key. In such an instance, the magnetic-ink field may further include an encryption-marker value that defines which of the plurality of possible encryption algorithms corresponds to the encryption algorithm. In different embodiments, the encryption algorithm may comprise a stream cipher or may comprise a block cipher. In addition, in some instances the authentication value may be further derived through application of a cryptographic hashing, such as may be based on a cyclic redundancy code. Examples of negotiable instruments that may be provided with such embodiments include drafts, such as checks, and notes.

In another set of embodiments, a method is provided for producing a document. Preparation information for the document is received. An encryption algorithm defined by a secure key is applied to selected portions of the preparation information to derive an authentication value. The document is then printed with information fields for providing written information to qualify the document as a negotiable instrument. A magnetic-ink field is printed on the document with ink that comprises a magnetic material, with the authentication value being included in the magnetic-ink field. In some such embodiments, the encryption algorithm may be selected from a plurality of possible encryption algorithms, each of which is defined by a secure key, according to an encryption-marker value defined by the preparation information; in such cases, the magnetic-ink field may further include the encryption-marker value. The encryption algorithm may comprise a stream cipher or a block cipher, and in some embodiments a cryptographic hashing, such as one based on a cyclic redundancy code, may also be applied. These methods may be embodied in a computer-readable storage medium having a computer-readable program embodied therein for directing operation of a computer system, with the program including instructions to implement the methods.

In a further set of embodiments, a method is provided for authenticating a negotiable instrument. Information read from the negotiable instrument is received. The information includes an authentication value read from a magnetic-ink field printed on the negotiable instrument with ink that comprises a magnetic material. An encryption algorithm defined by a secure key is applied to selected portions of the information read from the negotiable instrument to derive a result for comparison with the authentication value. As in other embodiments, the information may further include an encryption-mark value, in which case the method may further comprise selecting the encryption algorithm from a plurality of possible encryption algorithms, each of which is defined by a secure key, according to the encryption-marker value. The encryption algorithm may comprise a stream cipher or a block cipher. The method may further comprise applying a cryptographic hashing, such as one based on a cyclic redundancy code, to derive the result. These methods may be embodied in a computer-readable storage medium having a computer-readable program embodied therein for directing operation of a computer system, with the program including instructions to implement the methods.

In an additional set of embodiments, a method is provided for processing a negotiable instrument. An electronic package is received from a presenter at a first financial institution. The electronic package defines information read from the negotiable instrument, and the information includes an authentication value read from a magnetic-ink field printed on the negotiable instrument with ink that comprises a magnetic material. An encryption algorithm defined by a secure key is applied to selected portions of the information read from the negotiable instrument to derive a result. The presented is credited for funds in accordance with the information if the result is consistent with the authentication value. The information may further include an image of the negotiable instrument. The method may further comprise transmitting the electronic package with a request for recovery of the funds. The encryption algorithm may comprise a stream cipher or may comprise a block cipher, and, in some embodiments, a cryptographic hashing may further be applied to derive the result.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention use an encryption algorithm defined by a secure key to provide an authentication value that is included in a magnetic-ink character-recognition ("MICR") line of a negotiable instrument. Such an algorithm is sometimes referred to herein as a "secure-key encryption algorithm," and is intended to refer to an encryption process that depends on a secret encryption key used to define the algorithm. The algorithm itself may or may not itself be secret, and the key is not subject to the algorithm but is used externally in defining it. Several examples of such secure-key encryption algorithms are discussed below in connection with specific embodiments and are advantageous in the enhanced security they provide over other encryption schemes, such as schemes that merely incorporate a secret value into the information being encrypted. The authentication value is provided in addition to other information that may be included in the MICR line, such as the MICR version of the serial number of the instrument and relevant routing and/or account number information. One advantage to including the authentication value in the MICR line is that it is easily read by existing printing, reading, and sorting devices designed for processing negotiable instruments; implementation of embodiments of the invention does not require the use of additional readers or other equipment to process negotiable instruments.

This advantage is seen particularly in the ease with which systems that make use surrogates in place of original negotiable instruments may be accommodated. For example, the use of such surrogates may occur in systems that "truncate" processing of the negotiable instruments by removing an original paper instrument from the collection or return process and substituting it with the surrogate. Because routing information is included in the MICR line, preparation of the surrogate is generally performed in a manner that accurately retrieves information from the MICR line, making the placement of the authentication value especially valuable in ensuring authentication reliability. The surrogate may also include an electronically derived image of the negotiable instrument that is transmitted electronically as part of collection and return processes instead of being conveyed physically.

Figure 1:
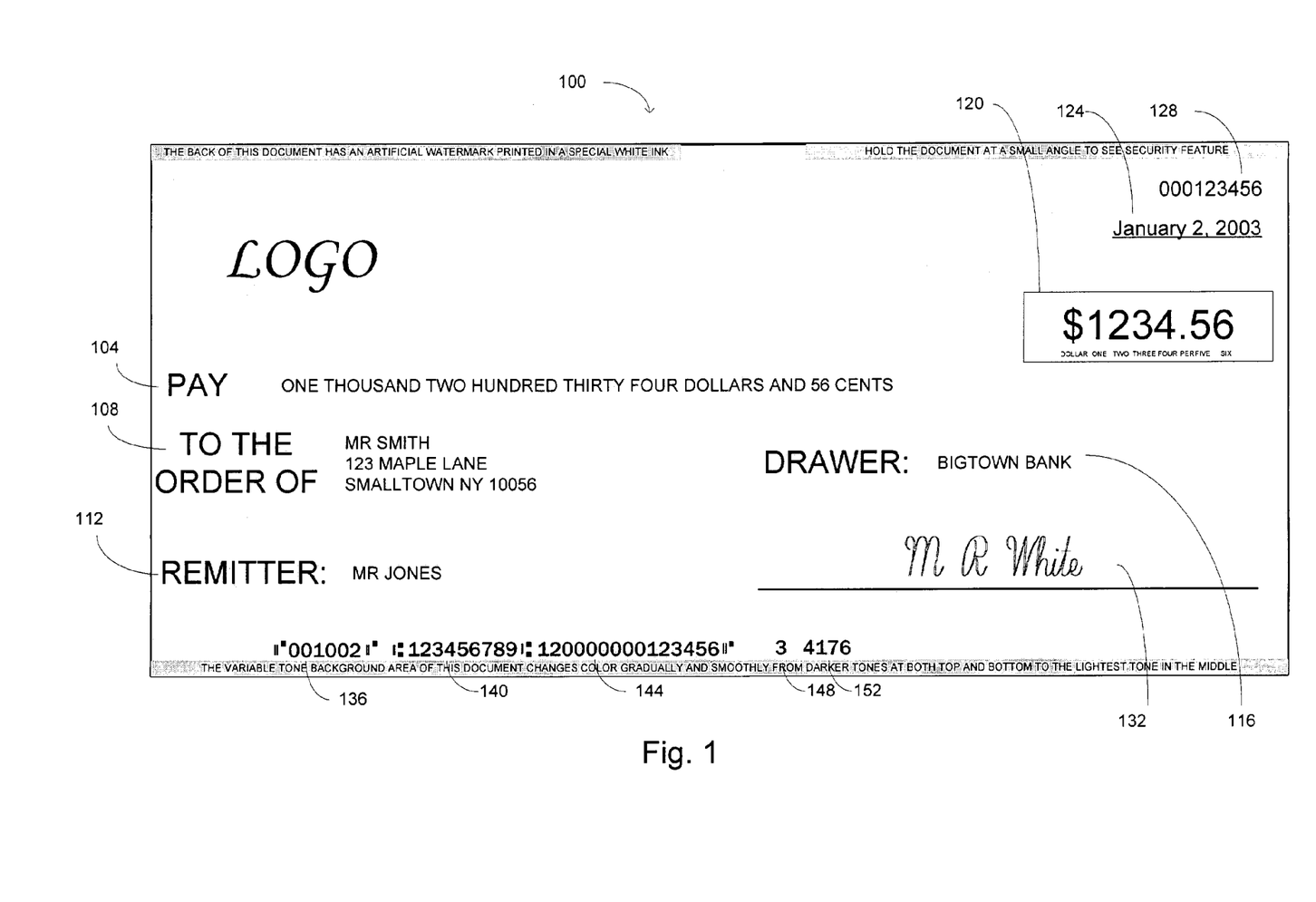
FIG. 1 provides an example of a negotiable instrument according to an embodiment of the invention.

An example of a negotiable instrument produced according to a method of the invention is illustrated in FIG. 1. The negotiable instrument 100 is shown in the form of an Official Checks$^{SM}$, such as may be provided by First Data Corporation® of Englewood, Colo., although it will be appreciated that embodiments of the invention are generally applicable to any negotiable instrument having MICR information. Thus, as used herein, a "negotiable instrument" is intended to be construed broadly to include any note, draft, check, cashier's check, teller's check, traveler's check, certificate of deposit, or any other instrument that falls within the definition of "negotiable instrument" provided in §3–104 of the Uniform Commercial Code.

The payment information of the instrument, including such factors as whether it is payable to bearer or to order, may differ depending on the type of instrument, but such differences do not affect the scope of the invention. Thus, for the negotiable instrument 100 shown in FIG. 1, the payment information includes a numerical indication of the amount to be paid 120, a written indication of the amount to be paid 104, an identification of order conditions 108, an identification of the drawer 116 of the instrument, and an identification of the remitter 112. For other types of negotiable instruments, the payment information may be different. In addition to the payment information, the instrument 100 shown in FIG. 1 includes a serial number 128, a date 124, a signature 132, and a MICR line that is shown as comprising numeric information. Currently, MICR characters include the numeric characters 0–9 and four special symbol characters, although the scope of the set of MICR characters does not limit the invention, which may generally be applied to any set of MICR characters. The MICR characters are printed on the instrument 100 with ink or toner that comprises a magnetic material such as ferrous oxide so that they each provide a unique magnetic signal when magnetized. The unique magnetic signal is related to the shape and magnetic content of the printed character.

The MICR line includes routing information that is used in processing the instrument 100 after it has been presented for payment. Such routing information may include, for example, an American Banking Association number 140 that identifies a financial institution, an account number 136, and the like, with the specific type of routing information sometimes depending on the type of negotiable instrument. In addition, the MICR line may include a MICR version of the serial number 144 of the instrument 100. According to embodiments of the invention, the MICR line may also include an encryption-marker value 148 and an authentication value 152. The encryption-marker value 148 may be used to identify one of a plurality of encryption methods used to determine the authentication value, depending on such factors as the encryption algorithm used, the key value used, the input values used, and the like. As described in further detail below, the instrument 100 may thus be validated by ensuring that application of the encryption method identified by the encryption-marker value 148 produces the correct authentication value 152. Space is often reserved to the right of the printed MICR information for subsequent printing of the amount of the instrument with magnetic ink, such as by a document endorser. In some embodiments where only a single encryption method is used, the encryption-marker value may be omitted. Also, while the encryption-marker value 148 is shown as a single-digit character and the authentication value 152 is shown as a four-digit character, they may more generally be of any length. The length of the authentication value 152 may reflect such factors as the appropriate difficulty of breaking the encryption scheme, convenience established by the encryption scheme, and similar such factors.

Figure 2:
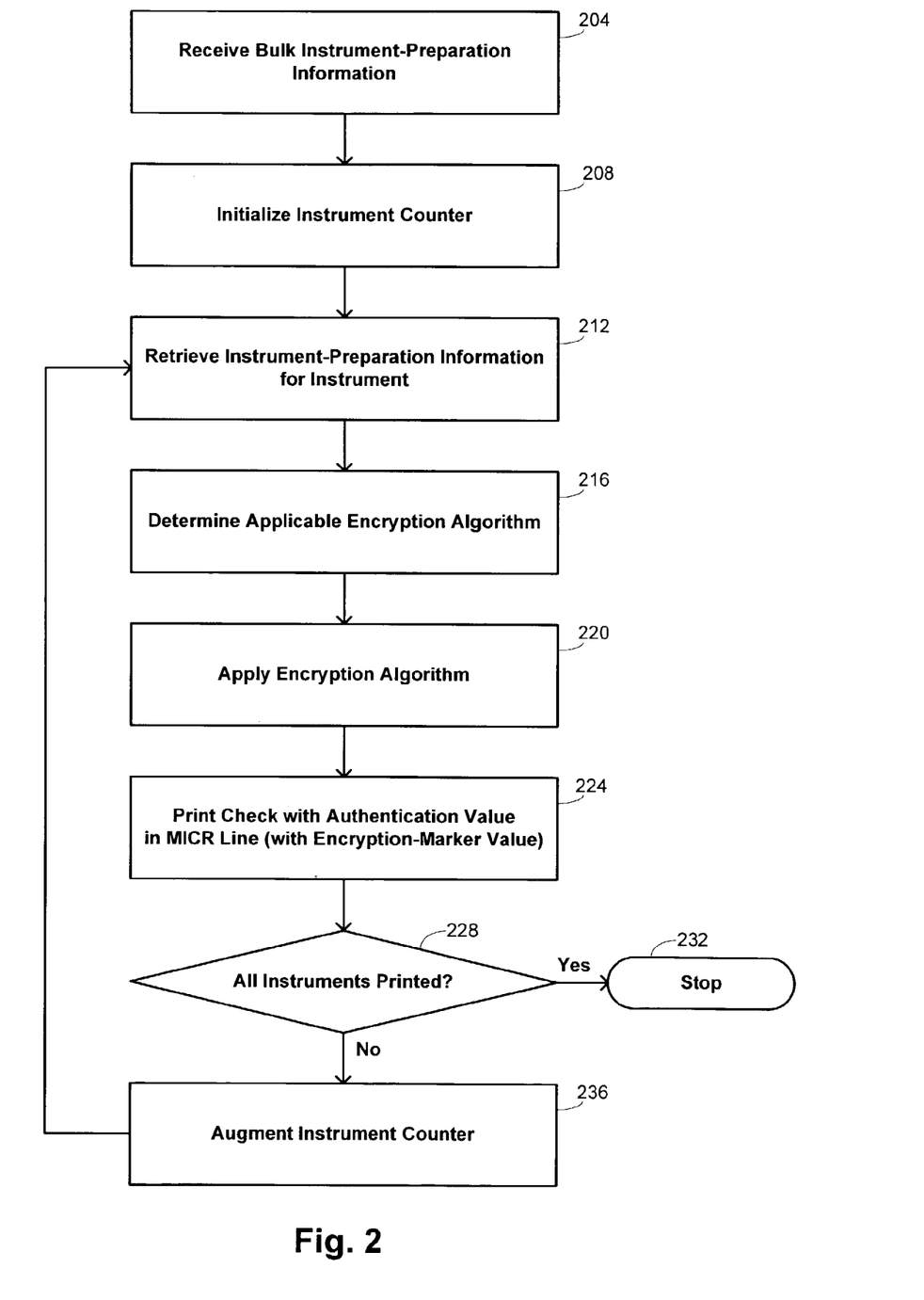
FIG. 2 is a flow diagram that illustrates a method for producing negotiable instruments in accordance with an embodiment of the invention.

In many instances, it is desirable to produce a plurality of negotiable instruments that include the authentication values in a batch process. One example of such a batch process is provided with the flow diagram shown in FIG. 2. In some embodiments, the method illustrated in FIG. 2 may be carried out by a computer system such as described below in connection with FIG. 6. At block 204, bulk instrument-preparation information is received. In some instances, such information may conveniently be received as an electronic file, either over a communications link or from a magnetic or optical storage device. The bulk instrument-preparation information may include such factors as the routing information to be printed for each instrument, the serial number of each instrument, the encryption scheme to be used for each instrument, and the like. At block 208, an instrument counter is initialized so that the instrument-preparation information for the first instrument may be retrieved at block 212. The applicable encryption algorithm is determined from the retrieved information at block 216 and applied at block 220 to determine the authentication value. The instrument is then printed at block 224 in accordance with the relevant instrument-preparation information. Such printing includes printing the MICR line with the appropriate routing information, the authentication value 152 and encryption-marker value 148 if used. A check is made at block 228 whether all instruments have been printed, with the method stopping at block 232 if they have been. If not, the instrument counter is augmented at block 236, and the method loops until all instruments defined by the instrument-preparation information have been printed.

The are a variety of different ways in which application of the encryption algorithm at block 220 may proceed. One example is illustrated with the flow diagram in FIG. 3. At block 304, a set of digits identified by the encryption algorithm is selected, such as from the other numerical information that is associated with the instrument. At block 308, the applicable encryption key is selected. In some embodiments, the same encryption key may be used for all the instruments while, in other embodiments, the encryption key may be defined for each instrument with the corresponding encryption-value marker.

Figure 3:
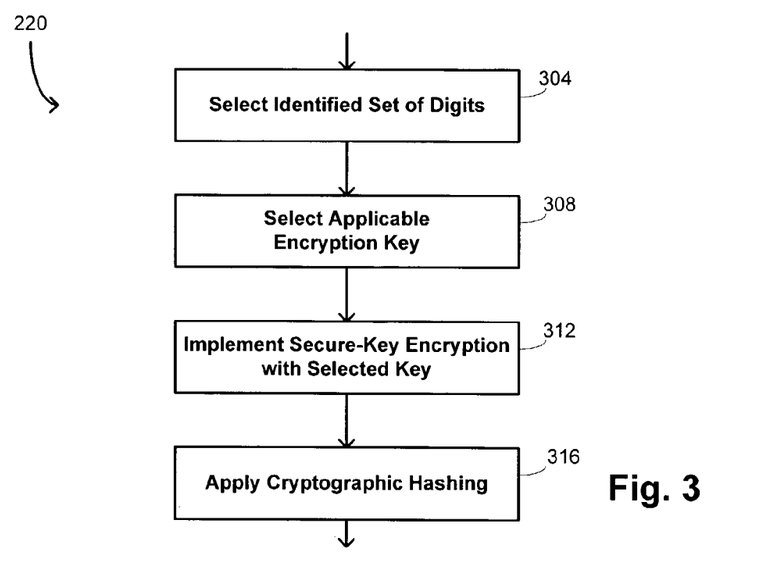
FIG. 3 is a flow diagram that illustrates a method for applying an encryption algorithm as part of producing negotiable instruments in accordance with an embodiment of the invention.

At block 312, the input set of digits selected at block 304 is encrypted with the encryption key selected at block 308 using the appropriate secure-key encryption technique. Any suitable secure-key encryption technique known to those of skill in the art may be used, including the use of stream ciphers and block ciphers. Stream ciphers operate on the input digits a single bit (or sometimes byte) at a time while block ciphers operate on groups of bits of the input digits. A typical block cipher operates on 64 bits at a time, although the invention is not limited by the block size. Many different types of block ciphers that may be used are known to those of skill in the art, including, for example, the Data Encryption Standard ("DES"), Lucifer, Madryga, NewDES, FEAL, REDOC and its variants, LOKI, Khufu, Khafre, RC2, IDEA, MMB, CA-1.1, Skipjack, GOST, CAST, Blowfish, SAFER, 3-Way, Crab, SXAL8, MBAL, and RC-5, among others. These block-cipher techniques are described in further detail in Bruce Schneier, *Applied Cryptography* (John Wiley & Sons 1996), 2d ed., Chaps. 12–14 ("Schneier I"), the entire disclosure of which is herein incorporated by reference in its entirety for all purposes. As explained further in Schneier I, most block ciphers comprise the use of Feistel networks, in which a block of even length n is divided into two halves of length n/2, although other encryption techniques may be used that do not comprise the use of Feistel networks.

In some embodiments, the encryption technique may comprise performing a plurality of encryptions. For example, in one embodiment, a double encryption is performed by encrypting a block successively with two different keys. In other embodiments, still greater numbers of encryptions may be performed, sometimes reusing keys as in a triple encryption scheme that successively applies key1, key2, and key1 to a block. Still other multiple-encryption techniques are known to those of skill in the art. Moreover, there are a variety of peripheral techniques known to those of skill in the art that may be incorporated to tailor the encryption technique to particular applications.

In some embodiments, cryptographic hashing may additionally be applied at block 316. Cryptographic hashing refers to a computationally efficient function mapping binary strings of arbitrary length to binary strings of some fixed length, often called "hash values." It thus permits a string of arbitrary length to be mapped to a smaller string in a fashion that makes recovery of the original string difficult. The use of such cryptographic hashing may be desirable to ensure that the authentication value 152 is of the desired length. There are numerous cryptographic hashing functions that are known to those of skill in the art and that may be used, including, for example Snefru, N-Hash, MD4, MD5, MD2, Secure Hash Algorithm ("SHA"), RIPE-MD, and HAVAL. Each of these cryptographic hashing techniques and others is described in further detail in Bruce Schneier, *Applied Cryptography* (John Wiley & Sons 1996), 2d ed., Chap. 18 ("Schneier II"), the entire disclosure of which is herein incorporated by reference in its entirety for all purposes.

Another class of cryptographic hashing techniques that may be used in some embodiments, and which are known to those of skill in the art, include the use of hash functions based on cyclic redundancy codes ("CRCs"). The use of CRCs may be viewed as taking a binary message and dividing it by a fixed binary number with the remainder being the CRC. The fixed binary number in the divisor is commonly called the generator polynomial. The following table provides examples of generator polynomials for producing CRCs with a desired number of bits:

| Method | Generator Polynomial | No. Bits |
|---|---|---|
| CRC-32 | $x^{32} + x^{26} + x^{23} + x^{22} +$ $x^{16} + x^{12} + x^{11} + x^{10} +$ $x^8 + x^7 + x^5 + x^4 +$ $x^2 + x + 1$ | 32 |
| CRC-24 | $x^{24} + x^{23} + x^{14} + x^{12} + x^8 + 1$ | 24 |
| CRC-16 | $x^{16} + x^{14} + x + 1$ | 16 |
| CRC-8 | $x^8 + x^7 + x^6 + x^4 + x^2 + 1$ | 8 |
| CRC-4 | $x^4 + x^3 + x^2 + x + 1$ | 4 |

The result of the encryption algorithm 220 described in connection with FIG. 3 is an authentication value 152 that has been produced through application of a secure-key encryption technique. Consequently, the security of the authentication value may result from its sensitivity to even minor changes in input value. The authentication value 152 is thus significantly more secure than simplistic alternative techniques, such as might be used by providing a check digit. This enhanced security arises from the nature of secure-key encryption, which depends on the use of a secret encryption key in an algorithm, while a check digit is merely the result of a secret algorithm. Thus, a check-digit algorithm is completely compromised by disclosure of the algorithm, while secure-key encryption may function securely even with a publicly available algorithm. Most check-digit algorithms are therefore relatively simple and are intended as a check that serves to provide an alert to the possibility that characters have been transposed rather than acting as security features resistant to decryption efforts.

Figure 4:
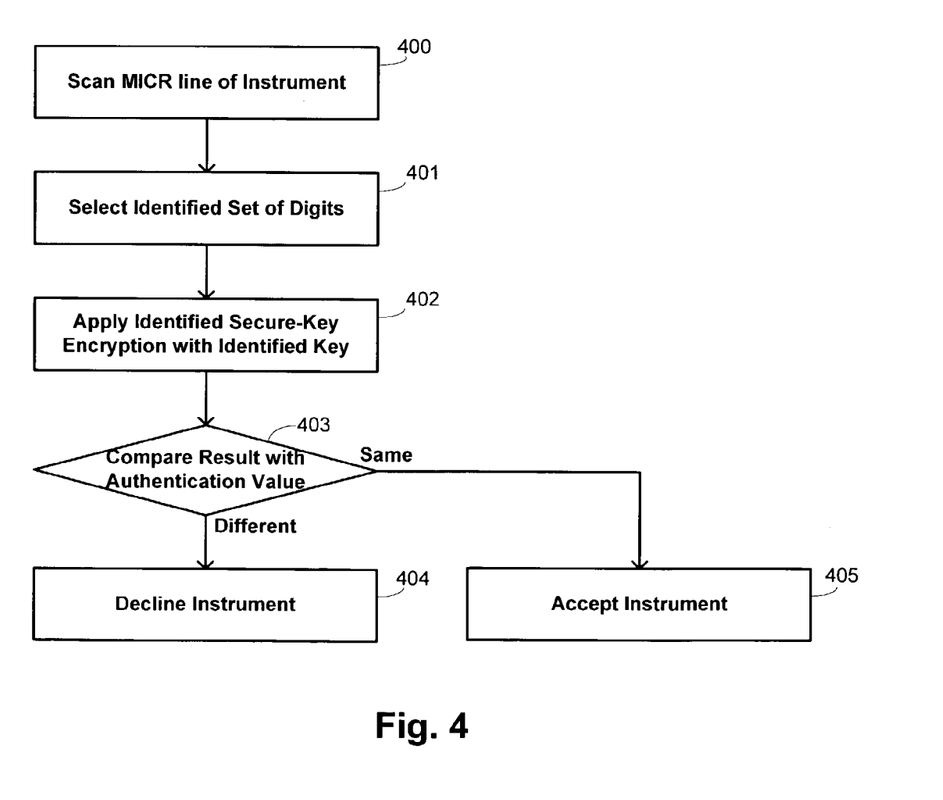
FIG. 4A is a flow diagram that illustrates a method for verifying the validity of a negotiable instrument in accordance with an embodiment of the invention.
FIG. 4B is a flow diagram that illustrates a method for verifying the validity of a negotiable instrument with an authentication authority in accordance with an embodiment of the invention.
FIG. 4C is a schematic illustration of communication between a MICR reader and an authentication authority.

FIG. 4 provides a flow diagram that illustrates a method for authenticating a negotiable instrument in accordance with an embodiment. At block 400, the MICR line of the negotiable instrument is scanned. The same set of digits identified at block 304 when the instrument was created are identified at block 401. Such identification may comprise identifying an applicable encryption algorithm and encryption key that defines the encryption algorithm according to an encryption-marker value 148 if such an encryption-marker value 148 is included on the instrument. At block 402, the identified encryption algorithm is applied according to the defining identified encryption key. The result of such encryption on the selected digits is compared with the authentication value 152 scanned from the instrument at block 403. If the result and authentication values are the same, the instrument is accepted at block 405, and, if they are different, the instrument is declined at block 404.

In some instances, authentication of negotiable instruments may be coordinated with an authentication authority. An example of such an embodiment is illustrated with the combination of FIGS. 4B and 4C, with FIG. 4B providing a flow diagram of a method for authenticating the instrument and FIG. 4C providing a schematic illustration of interaction with an authentication authority. The following description refers simultaneously to FIG. 4B and FIG. 4C. When an instrument is presented for payment, or perhaps as part of collection or return processes, the MICR line of the instrument is scanned at block 406 so that the various numerical values on the MICR line may be retrieved. In many embodiments, such scanning may be performed with a magnetic-ink reader 454 such as is known in the art. The scanned MICR-line information is then transmitted to the authentication authority 458 at block 408. The transmission may be effected with dedicated transmission lines or through a network protocol At block 412, the authentication authority 458 parses the received MICR-line information to identify the encryption-marker value 148 (if included), input information, and purported authentication value 152. At block 416, the encryption algorithm identified by the encryption-marker value 148 (or the default encryption algorithm if no encryption-marker value is included) is applied to the identified input data with the defining encryption key. Such application may be assisted with a data store 462 that includes an identification of such parameters as define the encryption algorithm and the secure key.

Figures 4B, 4C:
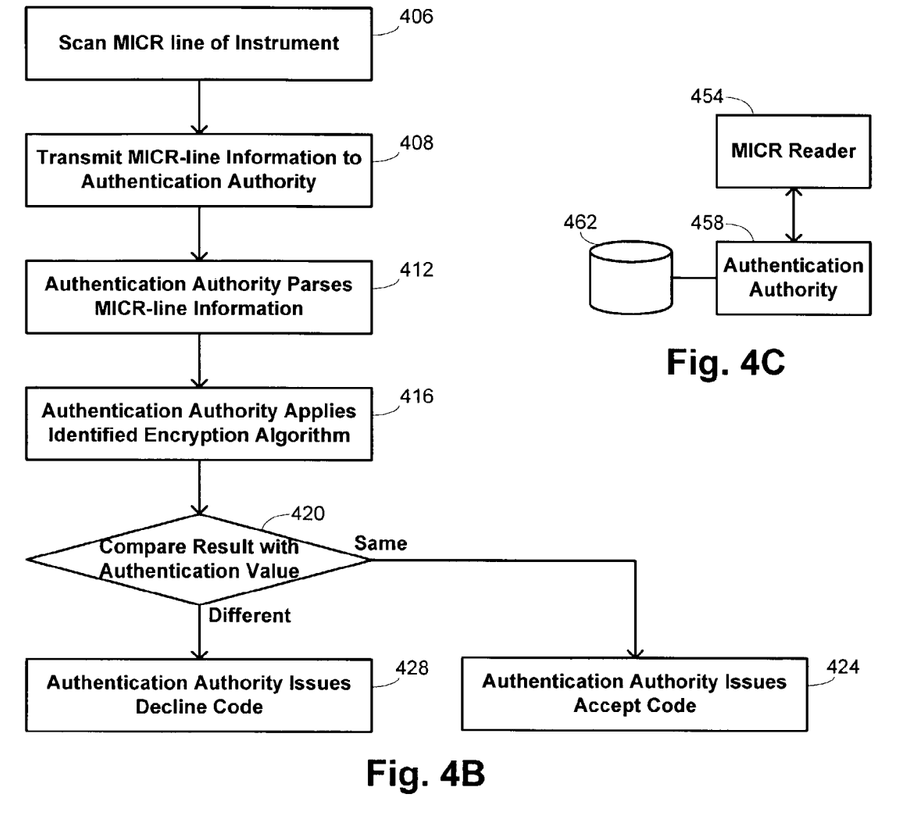

The result of applying the encryption algorithm is compared with the purported authentication value 152 at block 420 so that the authentication authority 458 may determine whether the instrument should be accepted or declined. If the result matches the purported authentication value, the authentication authority 458 issues a code that indicates the instrument should be accepted at block 424. Similarly, if the result fails to match the purported authentication value, the authentication authority 458 issues a code that indicates the instrument should not be accepted at block 428. In some embodiments, the authentication authority may comprise a computer system, such as described below in connection with FIG. 6, configured to perform the authentication functions.

There are a variety of ways in which the negotiable instruments of the invention may ultimately be processed. For example, each instrument may be processed in a traditional fashion in which it is physically conveyed from party to party. This provides each party with direct access to the MICR line so that the authenticity of the instrument may be verified directly. In a typical arrangement that uses such physical transfers, a clearing institution is often used to coordinate instruments drawn on a number of different institutions, with the clearing institution providing the mechanism for the exchange of instruments among participant financial institutions. In addition, some financial institutions use a reserve system, such as exemplified in the United States with the U.S. Federal Reserve Banking System, structured so that financial institutions set aside reserves held against customer deposits. Such reserves are held in reserve accounts by institutions within the reserve system. When an instrument is processed through a reserve institution, the reserve account for the financial institution presenting the instrument is credited, and in this way the reserve institution also functions as a clearing institution.

In other embodiments, truncation may be used to eliminate the need to convey the physical instruments. Such truncation may be implemented in some instances by having a financial institution remove the original instrument from the collection process once it comes into the hands of that financial institution. Alternatively, in some embodiments, the original instrument may be removed directly at a point-of-sale where it is accepted. A number of examples of arrangements that use such removal are described in copending, commonly assigned U.S. patent application Ser. No. 09/971,726, entitled "METHODS AND SYSTEMS FOR PROCESSING FINANCIAL INSTRUMENTS," filed Oct. 4, 2001 by Mark Thompson, the entire disclosure of which is herein incorporated by reference for all purposes. A general overview of some such systems is provided with the schematic diagram shown in FIG. 5A and the flow diagram provided in FIG. 5B. In these embodiments, truncation is effected in part by imaging the instrument and conveying the image of the instrument with the information scanned from the MICR line, although such imaging is not necessary.

Figure 5A:
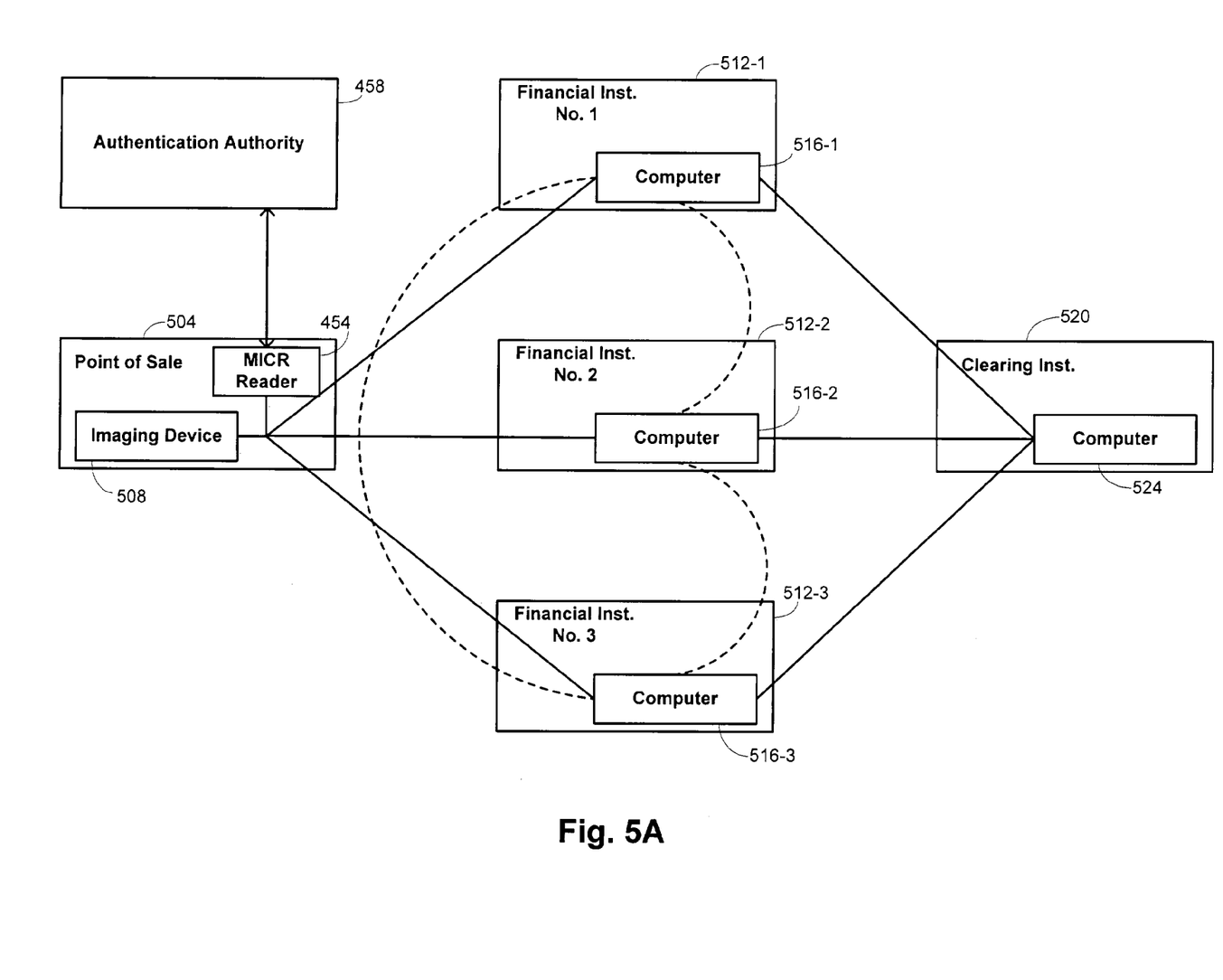
FIG. 5A is a schematic illustration of an arrangement that may be used to process images of negotiable instruments in an embodiment.

In the embodiment shown in FIG. 5A, electronic communications lines are provided to connect computers 516 at each of a plurality of financial institutions 512 with a computer 524 at a clearing institution 520 and with point-of-sale devices configured to extract the MICR-line information and/or image information from instruments. At the point of sale 504, a presented negotiable instrument may be validated through interaction with an authentication authority 458 by a MICR reader 454 as described in connection with FIGS. 4B and 4C. In one embodiment, the authentication authority 458 and clearing institution 520 are the same so that both authentication and clearing functions may be handled by a single entity.

An imaging device 508 may be configured to collect an image of the instrument for transmission to one or more financial-institution computers 516 upon receipt of an accept code from the authentication authority. In some embodiments, both the MICR reader 454 and imaging device 508 may be comprised by an integrated multifunction point-of-sale device such as described in one or more of the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al.; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg.

The communications lines shown in the schematic illustration by solid lines permit transmission of an electronic package that includes the MICR-line information and/or imaged financial instrument between the necessary entities as it is processed according to embodiments of the invention. The same communications lines may be used (in the opposite direction) in some embodiments for electronic funds transfers to satisfy the terms of the negotiable instruments. Since the negotiable instruments are received electronically by the clearing institution 520, software may be adapted as described below to improve sorting of the instruments before they are transmitted to the respective drawee financial institutions. The dashed lines in FIG. 5A are used to indicate that in other embodiments there may be electronic communications lines between the computers 516 of the different financial institutions 512. In one embodiment, such supplementary communications lines are used to bypass the clearing institution 520 so that the electronic package including the MICR-line information and/or imaged financial instrument is transferred directly between financial-institution computers 516. Software similar to that used by the clearing institution 520 may be provided on the computer system 516 of each financial institution 512 so that sorting of information for transmission to respective drawee financial institutions is simplified. Accordingly, embodiments in which communications are made directly between financial institutions without the use of a clearing institution are made more readily practical with truncation of negotiable instruments.

In embodiments where the truncation is performed by a financial institution 512 instead of at a point of sale 504, a suitable architecture may be similar to that shown in FIG. 5A. In such an instance, each of the financial institutions 512 may comprise a MICR reader and/or imaging device to derive the information to be transmitted electronically after truncation. Alternatively, the clearing institution 520 may comprise a MICR reader and/or imaging device to aid in performing the truncation, with physical instruments being physically delivered to the clearing institution 520 in the traditional fashion.

Figure 5B:
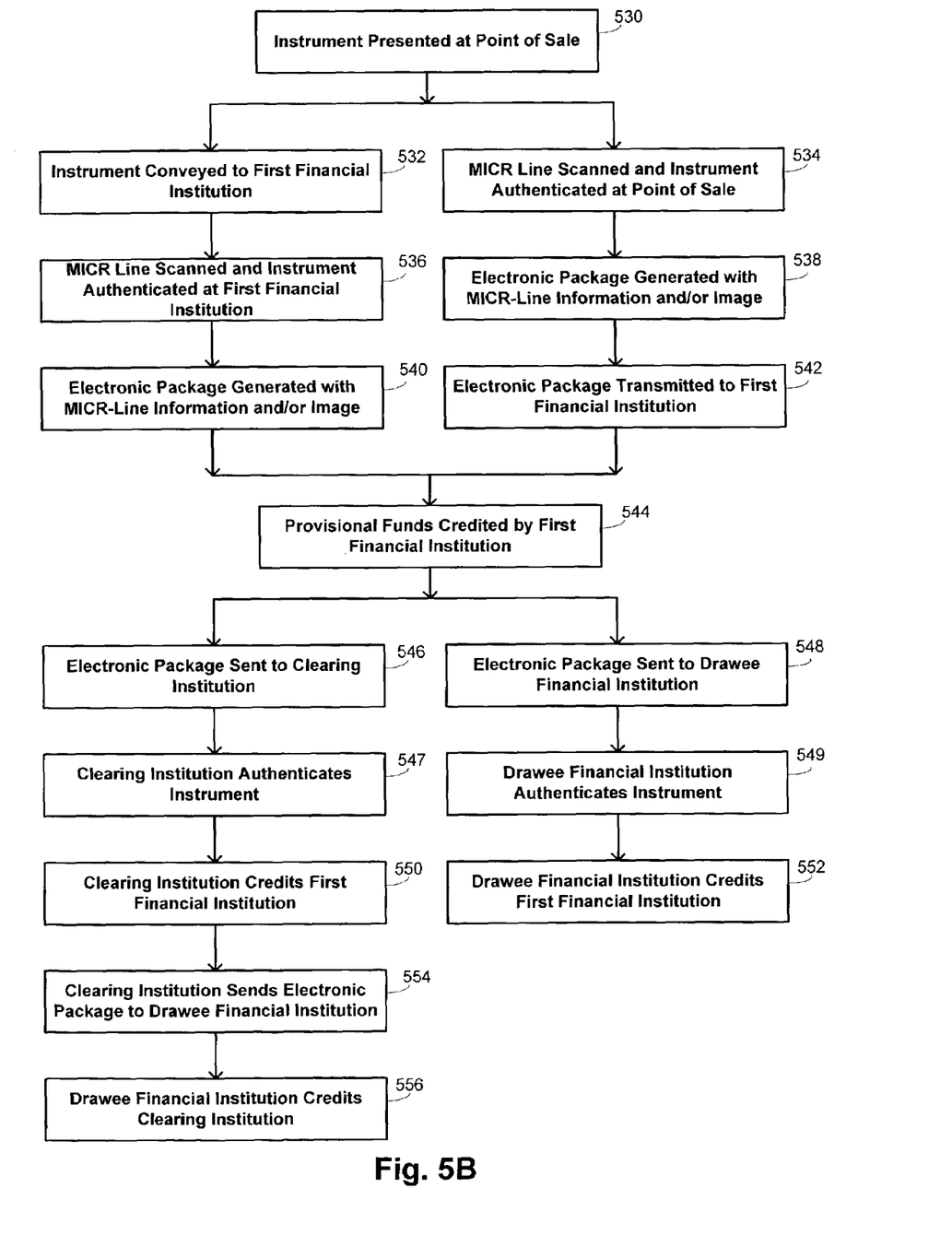
FIG. 5B is a flow diagram that illustrates how imaged negotiable instruments may be processed.

The manner in which the negotiable instruments may be processed with truncation at different points in the process is summarized with the flow diagram shown in FIG. 5B. At block 530, the negotiable instrument is presented as part of a transaction at the point of sale 504. After such presentment, the right side of the top of the figure shows truncation (and sometimes also authentication) performed at the point of sale 504 and the left side of the top of the figure shows authentication and truncation performed at a financial institution 512. As indicated on the right side, authentication may be performed at the point of sale 504 at block 534 by scanning the MICR line using a MICR reader 454 and conveying the scanned information to the authentication authority 458. If the authentication authority 458 returns an accept code as described above, an electronic package is generated that defines the MICR-line information and/or contains an image of the instrument at block 538. The electronic package usually also contains the accept code that serves to authenticate the instrument. The electronic package is thus transmitted to a first financial institution 512-1 at block 542. In other embodiments, authentication may be deferred to a clearing or drawee institution as described below, in which case the authentication at block 534 may be avoided. Such embodiments have the advantage of improved efficiency at the point of sale, which may be especially desirable in high-volume sale environments.

As indicated on the left side of the top of FIG. 5B, in another embodiment the instrument may be conveyed physically from the point of sale 504 to the first financial institution 512-1 at block 532. It is at the first financial institution 512-1 that the MICR line is scanned at block 536 and authenticated through communication with the authentication authority 458. If the authentication authority 458 returns an accept code as described above, the electronic package that defines the MICR-line information and/or contains an image of the instrument, usually together with the authenticating accept code, is generated at the first financial institution 512-1 at block 540.

Irrespective of whether the left or right branch at the top of FIG. 5B is followed, the first financial institution 512-1 is in possession of the electronic package containing the instrument information at block 540 or 542. Accordingly, the first financial institution 512-1 provisionally credits funds to an account of the entity presenting the instrument, such as of a party to the transaction effected at the point of sale 504. At this stage, different embodiments correspond to the use of a clearing institution 520 in the processing, shown in the left portion of the figure, and direct interaction between financial institutions, shown in the right portion of the figure. Thus, in embodiments that use a clearing institution 520, the electronic package is transmitted to the clearing institution 520 at block 546. The clearing institution 520 may perform its own authentication of the instrument at block 547 using the methods described above. This may be especially desirable in cases where no authentication has previously been performed on the instrument. The clearing institution 520 then credits the first financial institution 512-1 at block 550. After identifying the drawee financial institution, the clearing institution 520 transmits the electronic package to the drawee institution at block 554. The drawee financial institution, after examining the transmitted electronic package, credits the clearing institution 520 at block 556.

In embodiments that do not use the clearing institution 520, a similar process is followed. At block 548, the electronic package is transmitted from the first financial institution 512-1 to the drawee financial institution after that institution has been identified. The drawee financial institution may then perform its own authentication of the instrument at block 549, particularly if no previous authentication has been performed. The drawee financial institution, after examining the transmitted electronic package, credits the first financial institution at block 552.

There are alternative embodiments that will be evident to those of skill in the art after reading this description. For example, while the processing of the financial instrument has been described as including transmission of an electronic package between a point of sale, financial institutions, and/or a clearing institution, it will be appreciated that such transmission may be avoided. In particular, the electronic package may alternatively be stored in a data store accessible to each such entity, with transmission being made only of an identifier of the location of the electronic package in the data store. Each entity may then accesses the electronic package as it requires or desires in order to effect the processing of the instrument.

Figure 6:
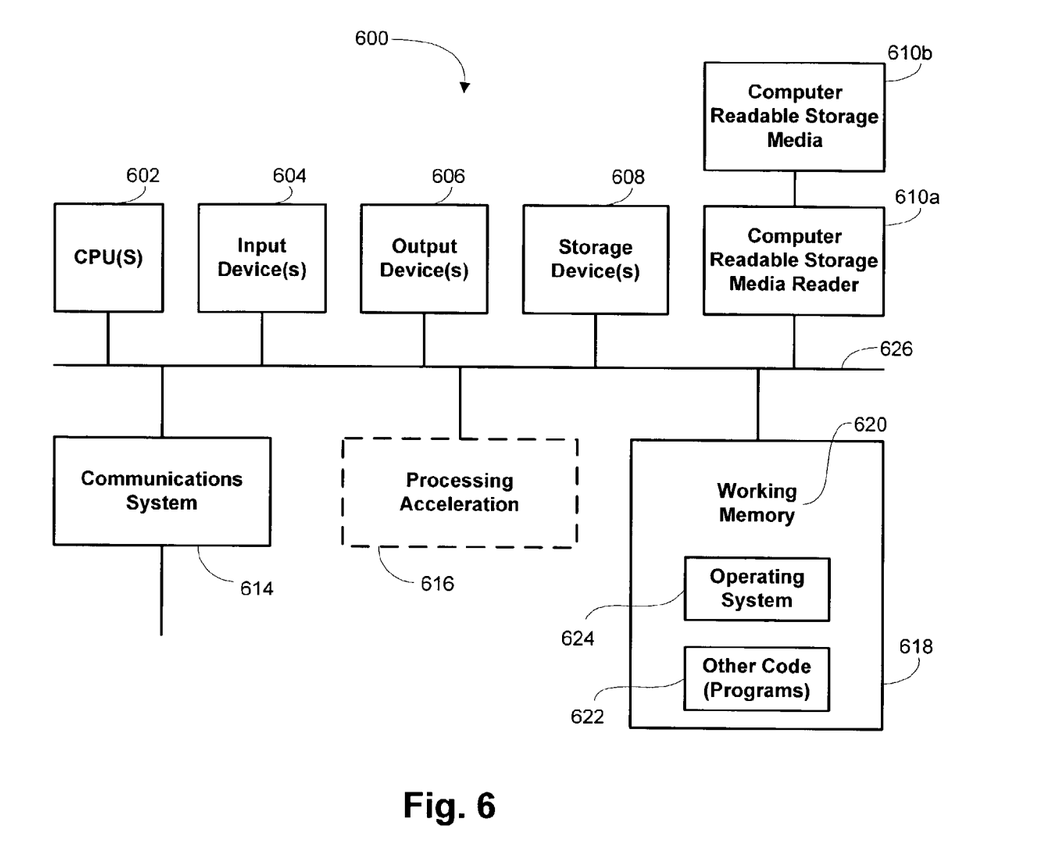
FIG. 6 is a schematic illustration of a computer system on which methods of the invention may be embodied.

FIG. 6 provides a schematic illustration of a structure that may be used to implement embodiments of the invention with a computer system 600. The computer system 600 or its equivalent may be used in applying the encryption algorithm to generate the authentication values, to coordinate a system for printing the negotiable instruments, to perform the authentication functions of the authentication authority, to coordinate functions of the point-of-sale devices, to coordinate functions at the financial institutions, and/or to coordinate functions at the clearing institution, among others. FIG. 6 broadly illustrates how individual system elements may be implemented in a separated or more integrated manner. The computer system 600 is shown comprised of hardware elements that are electrically coupled via bus 626, including a processor 602, an input device 604, an output device 606, a storage device 608, a computer-readable storage media reader 610*a*, a communications system 614, a processing acceleration unit 616 such as a DSP or special-purpose processor, and a memory 618. The computer-readable storage media reader 610*a* is further connected to a computer-readable storage medium 610*b*, the combination comprehensively representing remote, local, fixed, and/or removable storage devices plus storage media for temporarily and/or more permanently containing computer-readable information. The communications system 614 may comprise a wired, wireless, modem, and/or other type of interfacing connection and permits data to be exchanged among the point of sale 504, the authentication authority 458, the financial institutions 512, and/or the clearing institution 520 to implement embodiments as described above.

The computer system 600 also comprises software elements, shown as being currently located within working memory 620, including an operating system 624 and other code 622, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various other modifications, alternative constructions, and equivalents may be used without departing from the spirit of the invention. Accordingly, the above description should not be taken as limiting the scope of the invention, which is defined in the following claims.

What is claimed is:

1. A document for conducting a financial transaction, the document comprising:
   information fields for providing written information to qualify the document as a negotiable instrument; and
   a magnetic-ink field having characters printed in a single line on the document with ink that comprises a magnetic material, the magnetic-ink field including:
      routing information that identifies a financial institution and an account maintained at the financial institution;
      an authentication value derived through application of one of a plurality of predetermined secure-key encryption algorithms to information also printed on the document, each of the plurality of secure-key encryption algorithms being defined by a secret encryption key that is not itself subject to the each of the plurality of secure-key encryption algorithms; and
      an encryption-marker value that defines which of the plurality of secure-key encryption algorithms is the one of the plurality of secure-key encryption algorithms.

2. The document recited in claim 1 wherein the one of a plurality of secure-key encryption algorithm comprises a stream cipher.

3. The document recited in claim 1 wherein the one of the plurality of secure-key encryption algorithm comprises a block cipher.

4. The document recited in claim 1 wherein the authentication value is further derived through application of a cryptographic hashing.

5. The document recited in claim 4 wherein the cryptographic hashing is based on a cyclic redundancy code.

6. The document recited in claim 1 wherein the negotiable instrument comprises a draft.

7. The document recited in claim 6 wherein the negotiable instrument comprises a check.

8. The document recited in claim 1 wherein the negotiable instrument comprises a note.

9. A method for producing a document, the method comprising:
    receiving preparation information for the document;
    selecting portions of the preparation information;
    selecting one of a plurality of predetermined secure-key encryption algorithms, each of the plurality of secure-key encryption algorithms being defined by a secret encryption key that is not itself subject to the each of the plurality of secure-key encryption algorithms;
    encrypting the selected portions of the preparation information by applying the one of the plurality of secure-key encryption algorithms to derive an authentication value;
    printing the document with information fields for providing written information to qualify the document as a negotiable instrument; and
    printing a magnetic-ink field in a single line on the document with ink that comprises a magnetic material, the magnetic-ink field including:
        routing information that identifies a financial institution and an account maintained at the financial institution;
        the authentication value; and
        an encryption-marker value that defines which of the plurality of secure-key encryption algorithms is the one of the plurality of secure-key encryption algorithms.

10. The method recited in claim 9 wherein the one of the plurality of secure-key encryption algorithms comprises a stream cipher.

11. The method recited in claim 9 wherein the one of the plurality of secure-key encryption algorithms comprises a block cipher.

12. The method recited in claim 9 further comprising applying a cryptographic hashing to derive the authentication value.

13. The method recited in claim 12 wherein the cryptographic hashing is based on a cyclic redundancy code.

14. A method for authenticating a negotiable instrument, the method comprising:
    receiving information read from the negotiable instrument;
    receiving magnetic-ink-field information read from a magnetic-ink field of the negotiable instrument, the magnetic-ink field having characters printed in a single line with ink that comprises a magnetic material, wherein the magnetic-ink-field information includes:
        routing information that identifies a financial institution and an account maintained at the financial institution;
        an authentication value; and
        an encryption-marker value that defines one of a plurality of predetermined secure-key encryption algorithms, each of the plurality of secure-key encryption algorithms being defined by a secret encryption key that is not itself subject to the each of the plurality of secure-key encryption algorithms;
    identifying the one of the plurality of secure-key encryption algorithms from the encryption-marker value; and
    applying the one of the plurality of secure-key encryption algorithms to selected portions of the information read from the negotiable instrument to derive a result for comparison with the authentication value.

15. The method recited in claim 14 wherein the one of the plurality of secure-key the encryption algorithms comprises a stream cipher.

16. The method recited in claim 14 wherein one of the plurality of secure-key the encryption algorithms comprises a block cipher.

17. The method recited in claim 14 further comprising applying a cryptographic hashing to derive the result.

18. The method recited in claim 17 wherein the cryptographic hashing is based on a cyclic redundancy code.

19. A computer-readable storage medium having a computer-readable program embodied therein for directing operation of a computer system including an input device, a printer, and a processor, wherein the computer-readable program includes instructions for operating the computer system to process a financial transaction in accordance with the following:
    receiving preparation information for the document from the input device;
    selecting portions of the preparation information with the processor;
    selecting one of a plurality of predetermined secure-key encryption algorithms with the processor, each of the plurality of secure-key encryption algorithms being defined by a secret encryption key that is not itself subject to the each of the plurality of secure-key encryption algorithms;
    encrypting the selected portions of the preparation information by applying the one of the plurality of secure-key encryption algorithms with the processor to derive an authentication value;
    printing the document with the printer with information fields for providing written information to qualify the document as a negotiable instrument; and
    printing a magnetic-ink field with the printer in a single line on the document with ink that comprises a magnetic material, the magnetic-ink field including:
        routing information that identifies a financial institution and an account maintained at the financial institution;
        the authentication value; and
        an encryption-marker value that defines which of the plurality of secure-key encryption algorithms is the one of the plurality of secure-key encryption algorithms.

20. The computer-readable storage medium recited in claim 19 wherein the computer-readable program further includes instructions for applying a cryptographic hashing to derive the authentication value.

21. A computer-readable storage medium having a computer-readable program embodied therein for directing operation of a computer system including a communications device and a processor, wherein the computer-readable program includes instructions for operating the computer system to process a financial transaction in accordance with the following:
    receiving with the communications device information read from the negotiable instrument;
    receiving with the communications device magnetic-ink-field information read from a magnetic-ink field of the negotiable instrument, the magnetic-ink field having characters printed in a single line with ink that comprises a magnetic material, wherein the magnetic-ink-field information includes:
        routing information that identifies a financial institution and an account maintained at the financial institution;

an authentication value; and an encryption-marker value that defines one of a plurality of predetermined secure-key encryption algorithms, each of the plurality of secure-key encryption algorithms being defined by a secret encryption key that is not itself subject to the each of the plurality of secure-key encryption algorithms;

identifying with the processor the one of the plurality of secure-key encryption algorithms from the encryption-marker value; and applying an the one of the plurality of secure-key encryption algorithms with the processor to selected portions of the information read from the negotiable instrument to derive a result for comparison with the authentication value.

22. The computer-readable storage medium recited in claim 21 wherein the computer-readable program further includes instructions for applying a cryptographic hashing to derive the result.

23. A method for processing a negotiable instrument, the method comprising:

receiving an electronic package from a presenter, wherein the electronic package defines information read from the negotiable instrument and magnetic-ink-field information read from a magnetic-ink field of the negotiable instrument, the magnetic-ink field having characters printed in a single line with ink that comprises a magnetic material, wherein the magnetic-ink-field information includes;

routing information that identifies a financial institution and an account maintained at the financial institution;

an authentication value; and an encryption-marker value that defines one of a plurality of predetermined secure-key encryption algorithms, each of the plurality of secure-key encryption algorithms being defined by a secret encryption key that is not itself subject to the each of the plurality of secure-key encryption algorithms;

identifying the one of the plurality of secure-key encryption algorithms from the encryption-marker value;

applying the one of the plurality of secure-key encryption algorithms to selected portions of the information read from the negotiable instrument to derive a result; and crediting the presenter for funds in accordance with the information if the result is consistent with the authentication value.

24. The method recited in claim 23 wherein the information further includes an image of the negotiable instrument.

25. The method recited in claim 23 further comprising transmitting the electronic package to the financial institution with a request for recovery of the funds.

26. The method recited in claim 23 wherein the one of the plurality of secure-key encryption algorithms comprises a stream cipher.

27. The method recited in claim 23 wherein the one of the plurality of secure-key encryption algorithms comprises a block cipher.

28. The method recited in claim 23 further comprising applying a cryptographic hashing to derive the result.

* * * * *